March 31, 1925.

F. HODGKINSON

COUPLING AND BEARING ARRANGEMENT

Filed Aug. 4, 1921

F. Hodgkinson
INVENTOR

BY D. C. Davis
ATTORNEY

March 31, 1925.  1,531,285

F. HODGKINSON

COUPLING AND BEARING ARRANGEMENT

Filed Aug. 4, 1921  2 Sheets-Sheet 2

F. Hodgkinson
INVENTOR

BY D. C. Davis
ATTORNEY

Patented Mar. 31, 1925.

1,531,285

UNITED STATES PATENT OFFICE.

FRANCIS HODGKINSON, OF SWARTHMORE, PENNSYLVANIA, ASSIGNOR TO WESTINGHOUSE ELECTRIC AND MANUFACTURING COMPANY, A CORPORATION OF PENNSYLVANIA.

COUPLING AND BEARING ARRANGEMENT.

Application filed August 4, 1921. Serial No. 489,890.

*To all whom it may concern:*

Be it known that I, FRANCIS HODGKINSON, a subject of the King of Great Britain and Ireland, and a resident of Swarthmore, in the county of Delaware and State of Pennsylvania, have invented a new and useful Improvement in Coupling and Bearing Arrangements, of which the following is a specification.

My invention relates to a bearing and rigid coupling arrangement for the adjacent ends of aligned rotary elements, for example, a coupled turbine and generator, and has for its object to provide apparatus of the character designated which shall, at all times, maintain the bearings in alignment and insure that the load shall be properly distributed thereon.

In the accompanying drawings, forming a part of this application, Fig. 1 is a view showing one form of my improved bearing and coupling arrangement in section;

In a coupled turbine and generator installation having a bearing carried by each machine adjacent to the coupled shaft ends, it is not practicable to employ a rigid coupling on account of the expansion or change of position of parts, resulting in the whole load or a disproportionate amount of the load being carried by one of the bearings. It is common practice, therefore, with an arrangement of this kind, to use a flexible coupling in order to permit of relative transverse movement of the coupling elements in case of mis-alignment. This arrangement is, however, objectionable on account of wearing of the driving faces of the coupling, and it is also costly to make as compared with a coupling of the rigid type.

Another type of construction, is to provide a single supporting bearing carried by the turbine casing for the adjacent shaft ends and to provide a rigid coupling for the latter. However, where the load, due to the combined weight of the rotors, cannot be carried by the single bearing, this arrangement cannot be used.

Accordingly, therefore, I have provided a construction in which, like the first type referred to, a bearing is provided for each adjacent shaft end; but, unlike the first type, a rigid coupling is employed. The latter feature is rendered practicable by mounting the bearings in a rigid or transversely tiltable supporting structure or housing so that the bearings may be maintained in alignment and the load properly distributed thereon.

Figure 1:
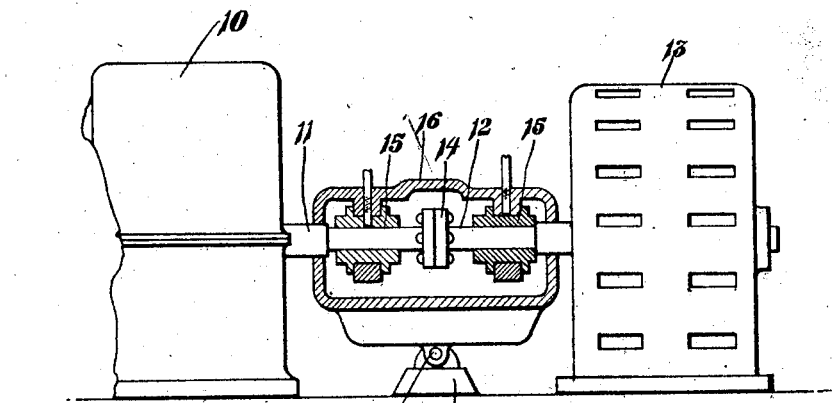

Referring now more particularly to the drawings for a detailed description of my invention, in Fig. 1, I show a turbine 10 provided with a rotor shaft 11 connected to the rotor shaft 12 of a generator 13 by means of a rigid coupling 14. The shafts 11 and 12 are rotatably mounted in bearings 15—15, the latter being arranged on opposite sides of the rigid coupling 14 and carried by a suitable supporting frame or housing 16, pivoted or fulcrumed in any suitable manner at 17 so as to permit of tilting about a transverse axis for purposes stated herein.

In Fig. 1, I show the lower portion of the supporting device or housing 16 pivoted, by means of a suitable pivot or fulcrum pin 17, to a stationary support 18; however, it will be obvious that any type of fulcrum connection might be employed, or a rigid structure might be used and reliance placed upon the inherent flexibility thereof to provide for the small amount of necessary displacement about a transverse axis. It will also be obvious that the fulcrum or pivot point may be so chosen as to secure a proper distribution of the load on the bearings, considering the weights of the rotors.

It will be noted, that, in Fig. 1, the supporting housing or structure for the bearings is mounted independently of the turbine; and, while it is capable of securing the results referred to, nevertheless it is subject to further modification for the reason that relative expansion, due to temperature differences between the turbine and the bearing supporting structure, may result in disturbance of the blade clearances in the turbine. In Figs. 2 to 6, inclusive, I have, therefor, shown structure in which the turbine and bearing supporting structure are so related as to permit expansion and contraction together.

In Figs. 2, 3, 4, and 6, I show a coupled turbine and generator similar to the structure of Fig. 1, except that a portion of the turbine structure is utilized to support the supporting device or housing 20 for the bearings. More particularly, supporting members 21 are provided for supporting the low-pressure end of the turbine 10 and extend rearwardly and inwardly to provide supporting portions 22 for the bearing supporting device or housing 20, which is preferably made in upper and lower portions provided with laterally extending flanges 23 resting upon the supporting portions 22. When the bearing support or housing 20 is supported in this way, the small amount of necessary movement to secure a distribution of pressure on the bearings may take place in the manner stated, due to the inherent flexibility of the supporting structure, particularly the flanges 23 and the supporting portions 22.

Figure 6:
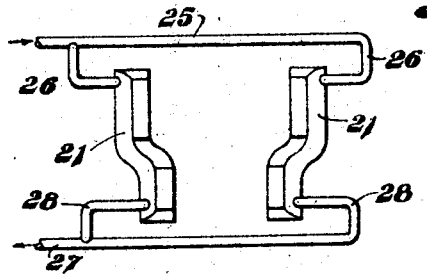
Fig. 6 is a diagrammatic view of the supporting elements used in Fig. 2.

In order that the supporting or housing members 21, may be maintained at uniform temperatures, I provide a water circulating system therefor. In Fig. 6, I show diagrammatically a water supply conduit 25 with branches 26 leading to the elements 21, and a water outlet conduit 27, connected to the other ends of the elements 21, by means of branches 28. It will therefore be obvious that, as each member 21 is submitted to approximately the same temperature conditions, there is no appreciable relative expansion for disturbing the bearings.

Figure 2:
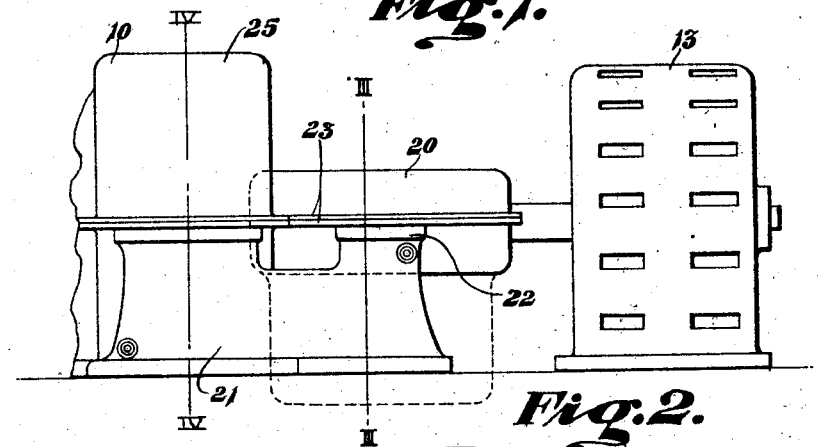
Fig. 2 is an elevational view showing a modified form of my invention.
Figure 3:
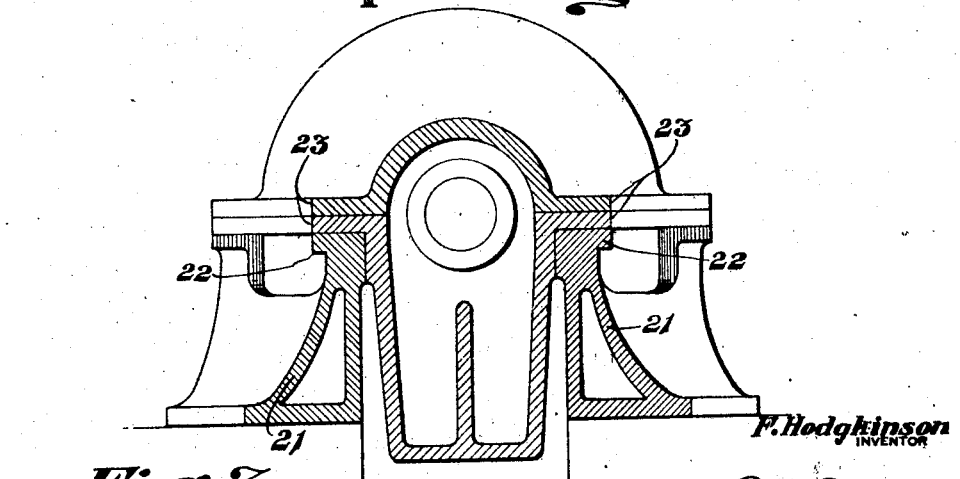
Figs. 3 and 4 are sectional views taken along the lines III—III and IV—IV, respectively, of Fig. 2.
Figure 4:
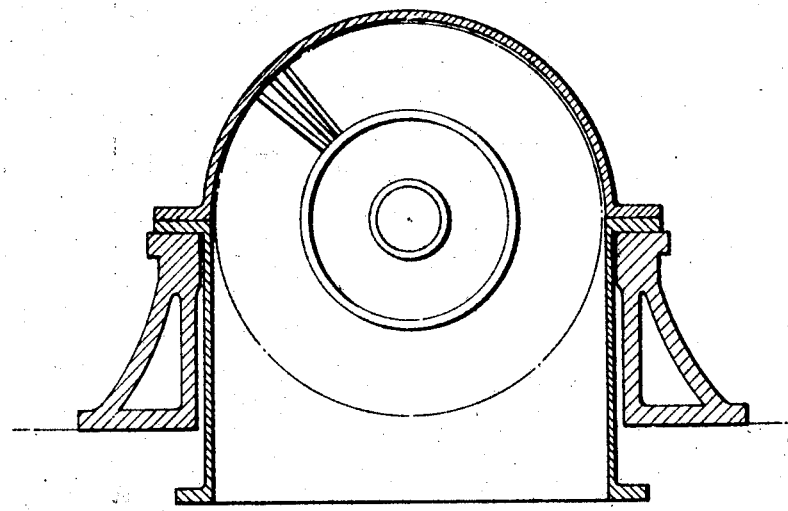
Figure 5:
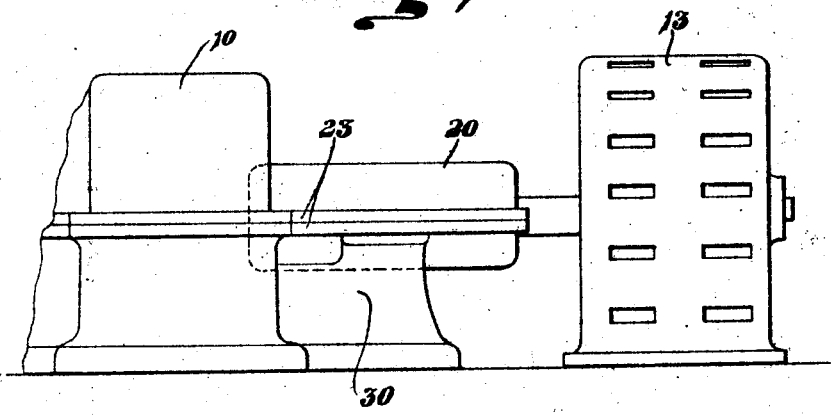
Fig. 5 is an elevational view of a further modified form of my invention.

In Fig. 5, I show a form of my invention which is similar to that shown in Fig. 2 except that the supporting members 30, for the bearing supporting structure or housing 20, are integral with or constitute extensions of the lower portion of the turbine casing.

From the foregoing, it will be apparent that I have provided a bearing structure for rigidly coupled ends of the shafts of a generator and of a turbine so supported as to secure alinement of the bearings at all times and proper distribution of the load on the latter.

While I have shown my invention in a plurality of forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:—

1. The combination with driving and driven shafts connected by a rigid coupling, of bearings at each side of the coupling for supporting the shafts, and an element capable of tilting movement for supporting said bearings.

2. The combination with driving and driven shafts connected by a rigid coupling, of bearings at each side of the coupling for supporting the shafts, and a tiltable frame for enclosing and for supporting said bearings.

3. The combination with turbine and generator shafts and a rigid coupling for the shafts, of supporting bearings for the shafts at opposite sides of the coupling, a frame for supporting the bearings, and means capable of tilting movement for supporting the frame.

4. The combination with turbine and generator rotor shafts coupled by means of a rigid coupling, of bearings for the shafts on opposite sides of the coupling and rigid supporting means for the bearings capable of tilting transversely, whereby the bearings may be maintained in alignment and each bearing carry its proper share of the load.

5. The combination with turbine and generator shafts connected together by a rigid coupling, of bearings for adjacent ends of the shafts and on opposite sides of the coupling, a rigid supporting member for the bearings for maintaining the bearings in alignment, and means for flexibly supporting said member with respect to an element of the turbine.

6. The combination with a turbine and a generator having shafts coupled by a rigid coupling, of supporting elements for one of the coupled members, bearings for the turbine and generator shafts on opposite sides of the coupling, and a rigid supporting device for the bearings carried by said elements and capable of tilting motion, whereby the bearings are at all times maintained in alignment and the load distributed thereon.

7. The combination with a turbine and a generator having shafts coupled by a rigid coupling, of supporting elements for one end of the turbine, bearings for the turbine and generator shafts on opposite sides of the coupling, a rigid supporting device for the bearings carried by said elements and capable of tilting motion, whereby the bearings are at all times maintained in alignment and the load distributed thereon, and fluid-circulating means for the supporting elements to maintain them at approximately equal temperatures.

8. The combination with a turbine and a generator having the rotor shafts thereof coupled by means of a rigid coupling, of bearings for the shafts on opposite sides of the coupling, and a rigid supporting housing for the bearings capable of tilting about a transverse axes, whereby the bearings may be maintained in alignment and the load distributed thereon, said housing being supported by the structure of the turbine.

In testimony whereof I have hereunto subscribed my name this 1st day of August, 1921.

FRANCIS HODGKINSON.